US010280836B2

(12) United States Patent
Ueda et al.

(10) Patent No.: US 10,280,836 B2
(45) Date of Patent: May 7, 2019

(54) VARIABLE NOZZLE UNIT AND VARIABLE GEOMETRY SYSTEM TURBOCHARGER

(71) Applicant: IHI Corporation, Koto-ku (JP)

(72) Inventors: Takafumi Ueda, Tokyo (JP); Akira Iwakami, Tokyo (JP); Yukio Takahashi, Tokyo (JP)

(73) Assignee: IHI Corporation, Koto-ku (JP)

( * ) Notice: Subject to any disclaimer, the term of this patent is extended or adjusted under 35 U.S.C. 154(b) by 437 days.

(21) Appl. No.: 15/144,015

(22) Filed: May 2, 2016

(65) Prior Publication Data
US 2016/0245160 A1   Aug. 25, 2016

Related U.S. Application Data

(63) Continuation of application No. PCT/JP2014/083129, filed on Dec. 15, 2014.

(30) Foreign Application Priority Data

Jan. 29, 2014   (JP) ................. 2014-014484

(51) Int. Cl.
F02B 37/24   (2006.01)
F01D 17/16   (2006.01)

(52) U.S. Cl.
CPC ............ *F02B 37/24* (2013.01); *F01D 17/165* (2013.01); *F05D 2220/40* (2013.01); *Y02T 10/144* (2013.01)

(58) Field of Classification Search
CPC .... F02B 37/24; F01D 17/165; F05D 2220/40; F05D 2220/90; Y02T 10/144
See application file for complete search history.

(56) References Cited

U.S. PATENT DOCUMENTS 7,399,156 B2 * 7/2008 Sterner ................. F01D 17/165
                                                        415/134
7,654,094 B2   2/2010 Yagi et al.
(Continued)

FOREIGN PATENT DOCUMENTS

CN   1918373 A   2/2007
JP   63-14843 U  1/1988
(Continued)

OTHER PUBLICATIONS

Machine Translation of JP2009243431 [retrieved on Jul. 18, 2018]. Retrieved from: Espacenet.*

(Continued)

*Primary Examiner* — David E Sosnowski
*Assistant Examiner* — Eric J Zamora Alvarez
(74) *Attorney, Agent, or Firm* — Oblon, McClelland, Maier & Neustadt, L.L.P.

(57) ABSTRACT

A second nozzle shaft of each variable nozzle has an outer diameter smaller than that of a first nozzle shaft. The first nozzle shaft is integrally formed on a first side surface of each variable nozzle. A portion is provided on a second side surface of each variable nozzle. The portion encloses the second nozzle shaft, and can contact a second nozzle ring. An inner nozzle flange and an outer nozzle flange which can contact a first nozzle ring are integrally formed on base sides of the first nozzle shaft on a blade surface and a blade surface of each variable nozzle, respectively.

5 Claims, 7 Drawing Sheets

(56) References Cited

U.S. PATENT DOCUMENTS

| | | | | |
|---|---|---|---|---|
| 8,485,778 B2* | 7/2013 | Zhang | ............... | F01D 9/042 |
| | | | | 415/163 |
| 2014/0112764 A1 | 4/2014 | Morita | | |

FOREIGN PATENT DOCUMENTS

| | | |
|---|---|---|
| JP | 2003-48033 | 2/2003 |
| JP | 2007-23840 | 2/2007 |
| JP | 2007-205311 | 8/2007 |
| JP | 2008-303792 | 12/2008 |
| JP | 2009-243431 | 10/2009 |
| JP | 2010-13983 | 1/2010 |
| JP | 2010-90713 | 4/2010 |
| JP | 2011-247189 | 12/2011 |
| JP | 2012-246807 | 12/2012 |
| JP | 2013-2293 | 1/2013 |

OTHER PUBLICATIONS

Combined Office Action and Search Report dated Oct. 30, 2017 in Chinese Patent Application No. 201480061533.9 (with English translation of categories of cited documents).

International Search Report dated Mar. 24, 2015 in PCT/JP2014/083129 filed on Dec. 15, 2014 ( with English Translation).

Written Opinion dated Mar. 24, 2015 in PCT/JP2014/083129 filed on Dec. 15, 2014.

* cited by examiner

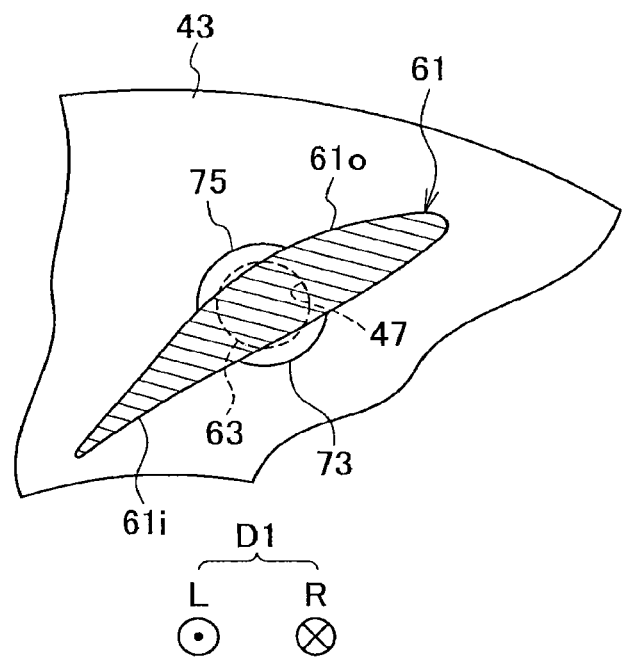
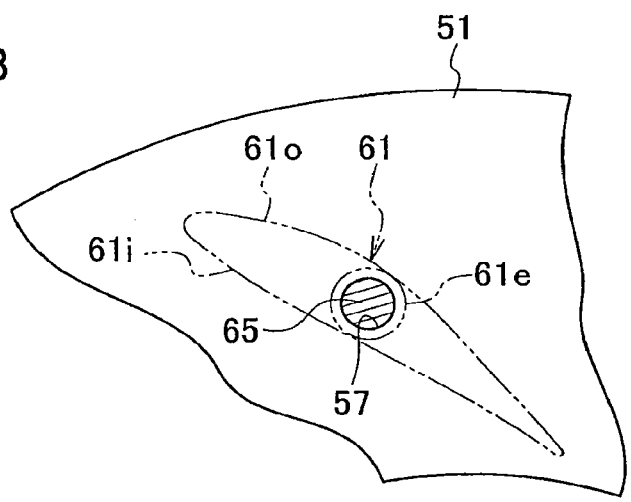

VARIABLE NOZZLE UNIT AND VARIABLE GEOMETRY SYSTEM TURBOCHARGER

CROSS REFERENCE TO RELATED APPLICATIONS

This application is a continuation application of International Application No. PCT/JP2014/083129, filed on Dec. 15, 2014, which claims priority to Japanese Patent Application No. 2014-014484, filed on Jan. 29, 2014, the entire contents of which are incorporated by reference herein.

BACKGROUND

1. Technical Field

The present disclosure relates, for example, to a variable nozzle unit that adjusts a passage area (throat area) for an exhaust gas to be supplied to a turbine wheel side in a variable geometry system turbocharger.

2. Description of the Related Art

In recent years, various types of development have been made on variable nozzle units used in variable geometry system turbochargers (see Japanese Patent Application Laid-Open Publication Nos. 2013-2293 and 2011-247189). Conventional variable nozzle units have the following specific configuration.

A first nozzle ring is disposed in a turbine housing in the variable geometry system turbocharger. The first nozzle ring has plural bottomless (penetrated) first supporting holes formed at intervals in a circumferential direction (in a predetermined circumferential direction). A second nozzle ring is integrally formed with the first nozzle ring. The second nozzle ring is provided at a location axially (in the axial direction of a turbine wheel) spaced apart from and opposite to the first nozzle ring. Furthermore, the second nozzle ring is located on a side further away from the bearing housing of the variable geometry system turbocharger (on a side opposite to the bearing housing) than the first nozzle ring. In addition, the second nozzle ring has plural bottomless (penetrated) second supporting holes formed so as to match the plural first supporting holes of the first nozzle ring.

The first nozzle ring and the second nozzle ring have facing surfaces facing each other. Plural variable nozzles are disposed at intervals in the circumferential direction (in a predetermined circumferential direction) between the facing surface of the first nozzle ring and the facing surface of the second nozzle ring. Each of the variable nozzles can rotate in an opening or closing direction (forward or reverse direction) around its shaft center, which is parallel to the shaft center of the turbine wheel. Each of the variable nozzles has a first nozzle shaft integrally formed on one side surface (one end surface). The first nozzle shaft is rotatably supported with a corresponding first supporting hole of the first nozzle ring. Furthermore, each of the variable nozzles has a second nozzle shaft integrally formed on the other side surface (the other end surface). The second nozzle shaft is rotatably supported with a corresponding second supporting hole of the second nozzle ring. In addition, a first nozzle flange (a first inner nozzle flange and a first outer nozzle flange) is integrally formed on a base end side of the first nozzle shaft on a blade surface (a blade surface inside in the radial direction and a blade surface outside in the radial direction) of each of the variable nozzles. Moreover, a second nozzle flange (a second inner nozzle flange and a second outer nozzle flange) is integrally formed on a base end side of the second nozzle shaft on a blade surface of each of the variable nozzles.

The first nozzle flange of each of the variable nozzles is configured to be able to contact the facing surface of the first nozzle ring. Therefore, it is possible to suppress the entry of foreign substances such as soot into the first supporting hole of the first nozzle ring by closing the gap between the inner peripheral surface of the first supporting hole of the first nozzle ring and the outer peripheral surface of the first nozzle shaft of the variable nozzle. Furthermore, the second nozzle flange of each of the variable nozzles is configured to be able to contact the facing surface of the second nozzle ring. Therefore, it is possible to suppress the entry of foreign substances into the second supporting hole of the second nozzle ring by closing the gap between the inner peripheral surface of the second supporting hole of the second nozzle ring and the outer peripheral surface of the second nozzle shaft of the variable nozzle. In addition, the first nozzle flange and the second nozzle flange of each of the variable nozzles are configured to be able to contact the facing surface of the first nozzle ring and the facing surface of the second nozzle ring, respectively. Therefore, it is possible to suppress tilting of the variable nozzle (the shaft center of the variable nozzle) by stabilizing the supporting state of the variable nozzle by the facing surface of the first nozzle ring and the facing surface of the second nozzle ring.

A link mechanism for synchronously rotating the plural variable nozzles is disposed on an opposite surface side of the facing surface of the first nozzle ring. As the link mechanism synchronously rotates the plural variable nozzles in the forward direction (opening direction), the passage area (throat area) for an exhaust gas to be supplied to the turbine wheel side increases. As the link mechanism synchronously rotates the plural variable nozzles in the reverse direction (closing direction), the passage area for the exhaust gas to be supplied to the turbine wheel side decreases.

SUMMARY

As described above, the first nozzle flange and the second nozzle flange of the variable nozzle are required, for example, to suppress the entry of the foreign substances, for example, into the first supporting holes of the first nozzle ring. However, on the other hand, the first nozzle flange and the second nozzle flange of the variable nozzle locally impede the flow of main stream of the exhaust gas. Therefore, the pressure loss between variable nozzles may increase depending on operational conditions of the variable geometry system turbocharger to lower turbine efficiency of the variable geometry system turbocharger. Thus, further increase of the turbine efficiency of the Variable Geometry System turbocharger is desired.

It is an object of the present disclosure to provide a variable nozzle unit and a variable geometry system turbocharger, which can solve the problem described above.

A first aspect of the present disclosure is a variable nozzle unit disposed between a turbine scroll passage and a turbine wheel in a turbine housing of a variable geometry system turbocharger, and configured to adjust a passage area (throat area) of an exhaust gas to be supplied to the turbine wheel side, comprising:

a first nozzle ring disposed in the turbine housing and having a plurality of first supporting holes formed at intervals in a circumferential direction (in a predetermined circumferential direction);

a second nozzle ring provided integrally with the first nozzle ring at a location axially spaced apart from and opposite to the first nozzle ring, and having a plurality of second supporting holes formed so as to match the plurality of first supporting holes of the first nozzle ring;

a plurality of variable nozzles disposed at intervals in the circumferential direction (in a predetermined circumferential direction) and between the first nozzle ring and the second nozzle ring, the variable nozzles being capable of rotating in a forward or reverse direction (in an opening or closing direction) about a shaft center parallel to a shaft center of the turbine wheel, and each variable nozzle having a first nozzle shaft and a second nozzle shaft, the first nozzle shaft being integrally formed on one side surface (one end surface) and rotatably supported with the corresponding first supporting hole of the first nozzle ring, and the second nozzle shaft being integrally formed on the other side surface (other side end surface) and rotatably supported with the corresponding second supporting hole of the second nozzle ring; and a link mechanism configured to synchronously rotate the plurality of variable nozzles in the forward or reverse direction, wherein an outer diameter of one nozzle shaft of the first nozzle shaft and the second nozzle shaft of each variable nozzle is smaller than an outer diameter of the other nozzle shaft, wherein a portion enclosing the one nozzle shaft on one of the one side surface and the other side surface of each of the variable nozzles is configured to be capable of contacting with one nozzle ring of the first nozzle ring and the second nozzle ring, and wherein a nozzle flange (an inner nozzle flange and an outer nozzle flange) is integrally formed on a base side of the other nozzle shaft on a blade surface (a blade surface inside in the radial direction and a blade surface outside in the radial direction) of each of the variable nozzles so that the nozzle flange can contact the facing surface of the other nozzle ring.

It should be noted that, in description and claims of the present application, the term "disposed" not only means "directly disposed" but also means "disposed indirectly through another member", and the term "provided" not only means "directly provided" but also means "provided indirectly through another member." In addition, the expression "axially" means in the axial direction of the turbine wheel (in other words, the axial direction of the first nozzle ring or second nozzle ring). Note that the expression "radial direction" means the radial direction of the turbine wheel (in other words, the radial direction of the first nozzle ring or second nozzle ring).

A second aspect of the present disclosure is a variable geometry system turbocharger that uses energy of an exhaust gas from an engine to supercharge air to be supplied to the engine side, the variable geometry system turbocharger including the variable nozzle unit according to the first aspect.

According to the present disclosure, it is possible to suppress the entry of foreign substances, for example, into the first supporting hole of the first nozzle ring, or tilting of the variable nozzle, even if a nozzle flange, which impedes the flow of the main stream of the exhaust gas, is eliminated from a base end side of the one nozzle shaft of each of the variable nozzles. Thus, pressure loss between the variable nozzles can be reduced during operation of the variable geometry system turbocharger, to achieve further increase of turbine efficiency of the variable geometry system turbocharger.

BRIEF DESCRIPTION OF THE DRAWINGS

FIG. 5A is an enlarged view of a portion indicated by the arrow VA in FIG. 3, and FIG. 5B is an enlarged view of a portion indicated by the arrow VB in FIG. 4.

FIG. 6A illustrates a state of the variable nozzle when viewed from a blade surface side on the inner side in the radial direction, and FIG. 6B illustrates a state of the variable nozzle when viewed from a blade surface side on the outer side in the radial direction.

DESCRIPTION OF THE EMBODIMENTS

Figure 1:
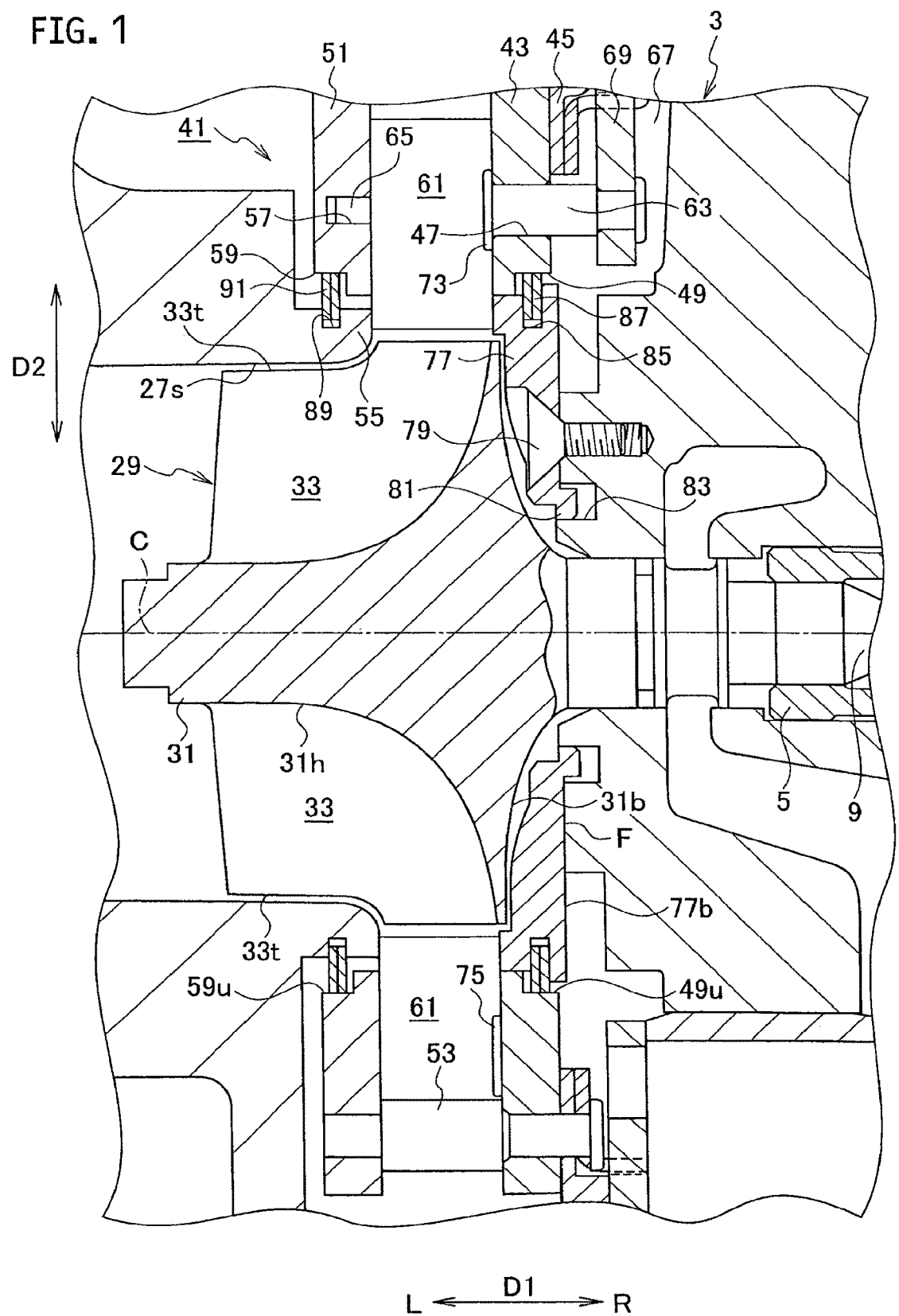
FIG. 1 is an enlarged view of a portion indicated by the arrow I in FIG. 2.

An embodiment according to the present disclosure will be described with reference to FIGS. 1 to 7. Note that, in the drawings, "L" represents the left direction, "R" represents the right direction, "D1" represents the axial direction, "D2" represents the radial direction, and "D3" represents the rotational direction of a turbine wheel.

Figure 7:
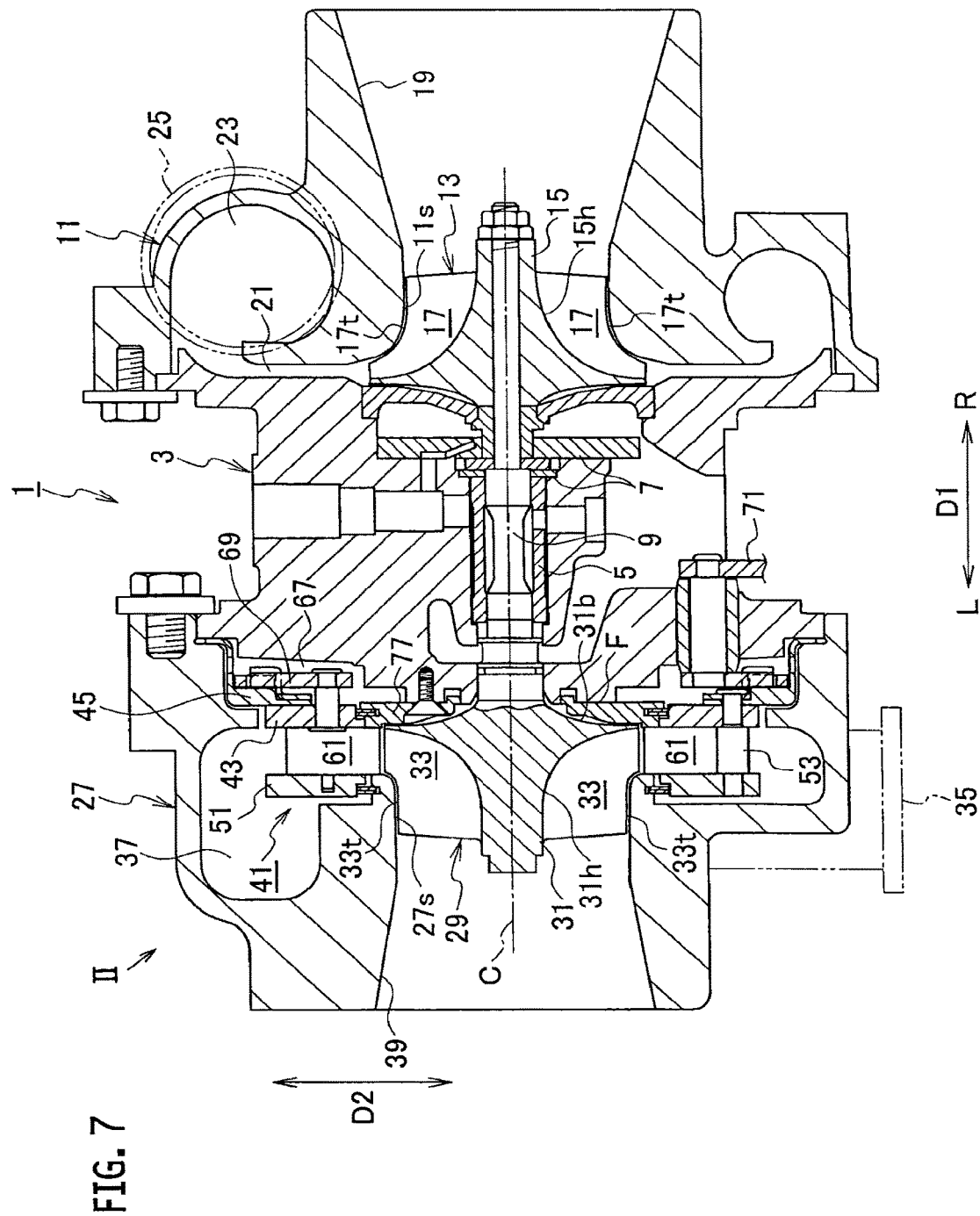
FIG. 7 is a front sectional view of a variable geometry system turbocharger according to an embodiment of the present disclosure.

As illustrated in FIG. 7, a variable geometry system turbocharger 1 according to this embodiment is a device that supercharges (compresses) air to be supplied to an engine (not illustrated) using energy of an exhaust gas from the engine.

The variable geometry system turbocharger 1 includes a bearing housing 3. The bearing housing 3 has a radial bearing 5 and a pair of thrust bearings 7 provided therein. Furthermore, in the plural bearings 5 and 7, there is rotatably provided a rotor shaft (turbine shaft) 9 extending in the left and right direction. In other words, in the bearing housing 3, there is rotatably provided the rotor shaft 9 through the plural bearings 5 and 7.

A compressor housing 11 is provided at the right side of the bearing housing 3. The compressor housing 11 has a shroud 11s provided thereinside. In the compressor housing 11, a compressor wheel 13 that compresses air using centrifugal force is rotatably provided around its shaft center C (in other words, the shaft center of the rotor shaft 9). The compressor wheel 13 includes a compressor disk 15 coupled integrally with the right end portion of the rotor shaft 9. The compressor disk 15 has a hub surface 15h extending toward the left side outward in the radial direction (outward in the radial direction of the compressor wheel 13). The hub surface 15h of the compressor disk 15 has plural compressor blades 17 provided integrally thereon and arranged at intervals in the circumferential direction. The compressor blades 17 each have a distal end edge (outer edge) 17t extending along the shroud 11s of the compressor housing 11. Note that, in addition to the plural compressor blades 17, it may be possible to use other compressor blades (not illustrated) having the axial length shorter than that of the compressor blade 17. In this case, the compressor blade 17 and the compressor blade having the shorter axial length than the compressor blade 17 are alternately provided integrally on the hub surface 15h of the compressor disk 15.

An air inlet 19 for taking air is formed on the inlet side (upstream side in terms of the direction of flow of the main stream of the air) of the compressor wheel 13 in the compressor housing 11. The air inlet 19 is connected to an air cleaner (not illustrated) for cleaning air. A ring-shaped diffuser passage 21 that increases pressure of compressed air is formed on the outlet side (downstream side in terms of the direction of flow of the air) of the compressor wheel 13 and between the bearing housing 3 and the compressor housing 11. A compressor scroll passage 23 having a spiral shape is formed within the compressor housing 11. The compressor scroll passage 23 communicates with the diffuser passage 21. An air discharging port 25 for discharging compressed air is formed at an appropriate location in the compressor housing 11. The air discharging port 25 communicates with the compressor scroll passage 23, and is connected with an intake manifold (not illustrated) of the engine.

Figure 2:
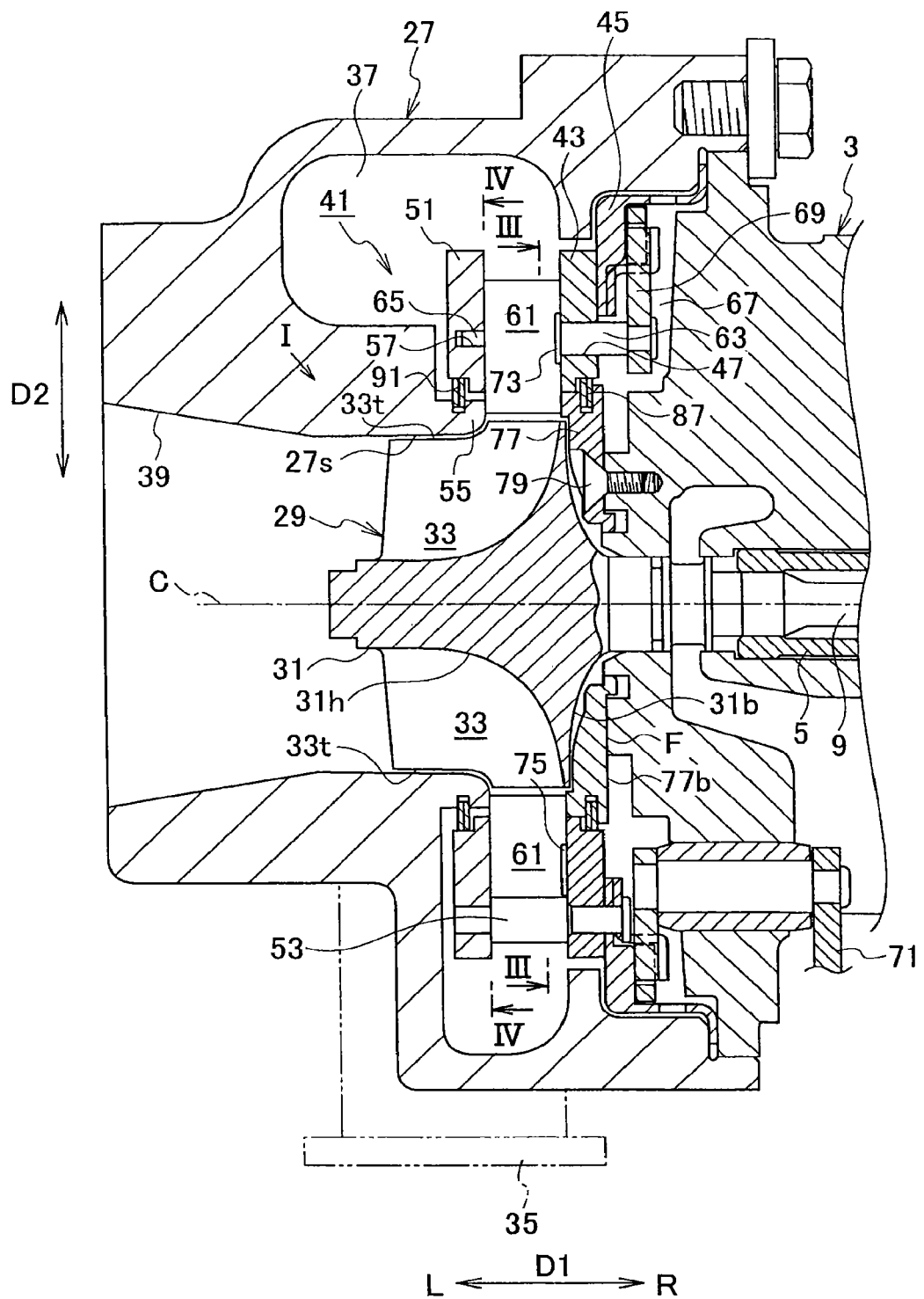
FIG. 2 is an enlarged view of a portion indicated by the arrow II in FIG. 7.
Figure 3:
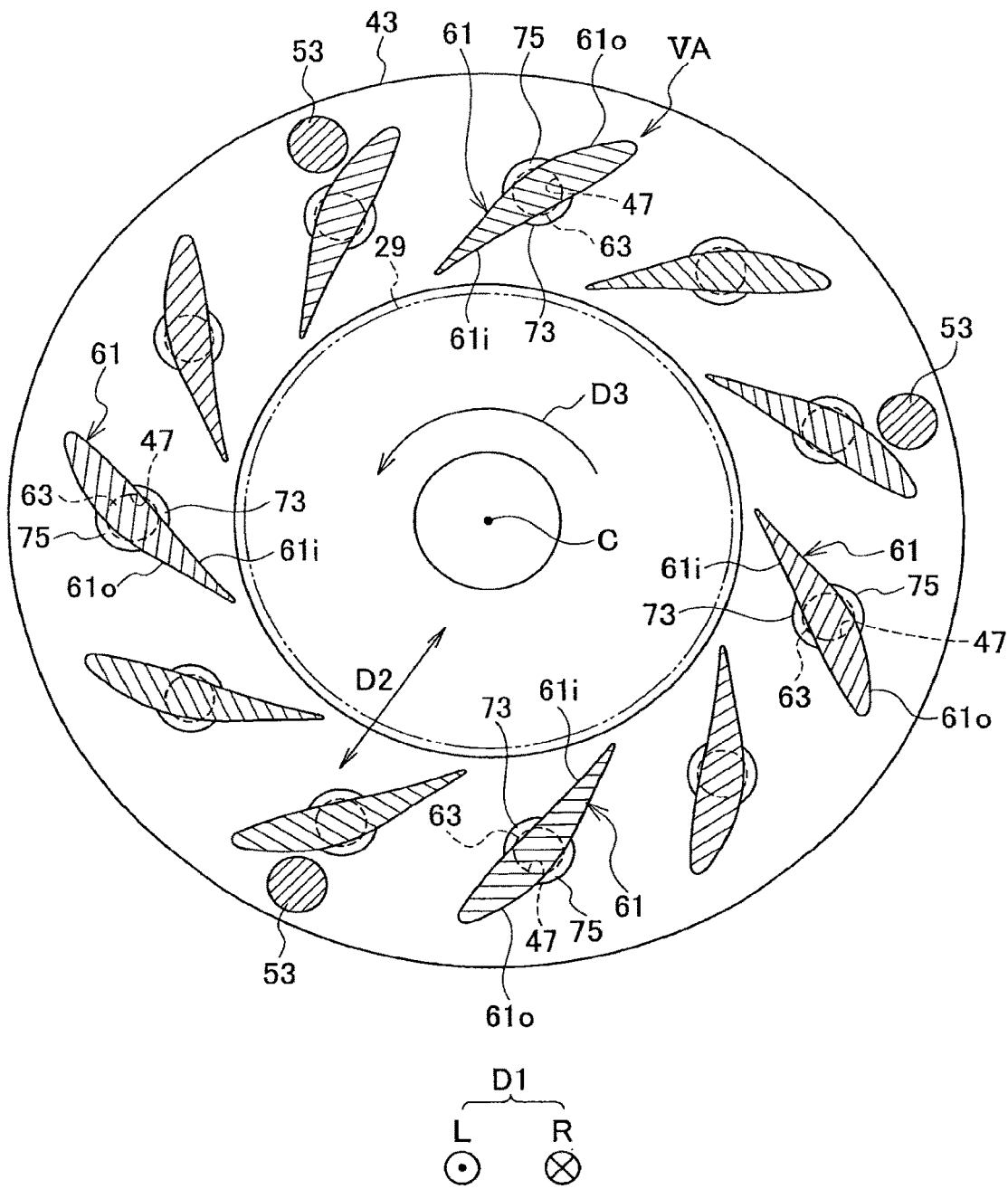
FIG. 3 is an enlarged sectional view taken along the line in FIG. 2, and illustrates a state of plural variable nozzles being opened.
Figure 4:
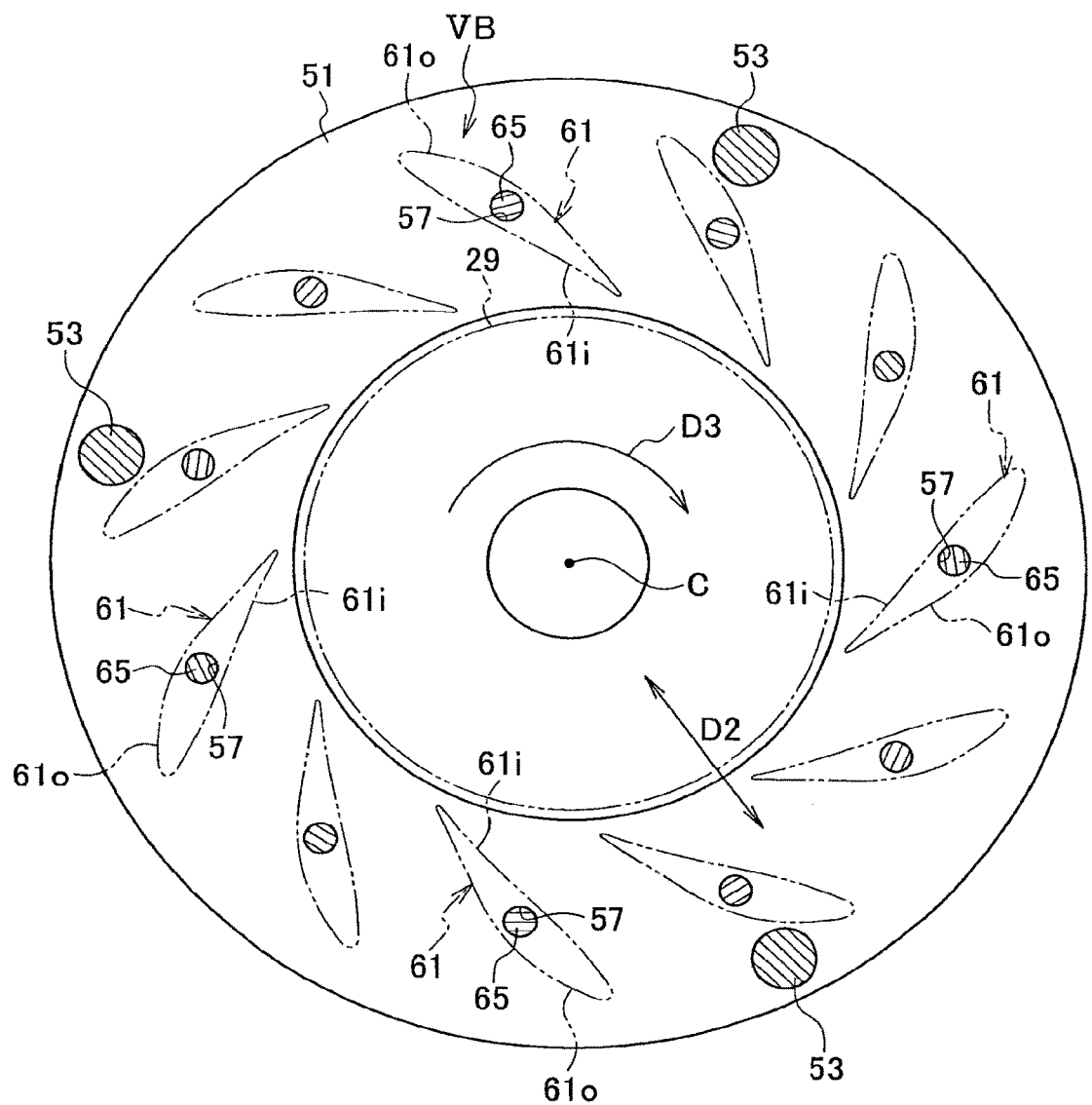
FIG. 4 is an enlarged sectional view taken along the line IV-IV in FIG. 2, and illustrates a state of plural variable nozzles being opened.
Figure 6A:
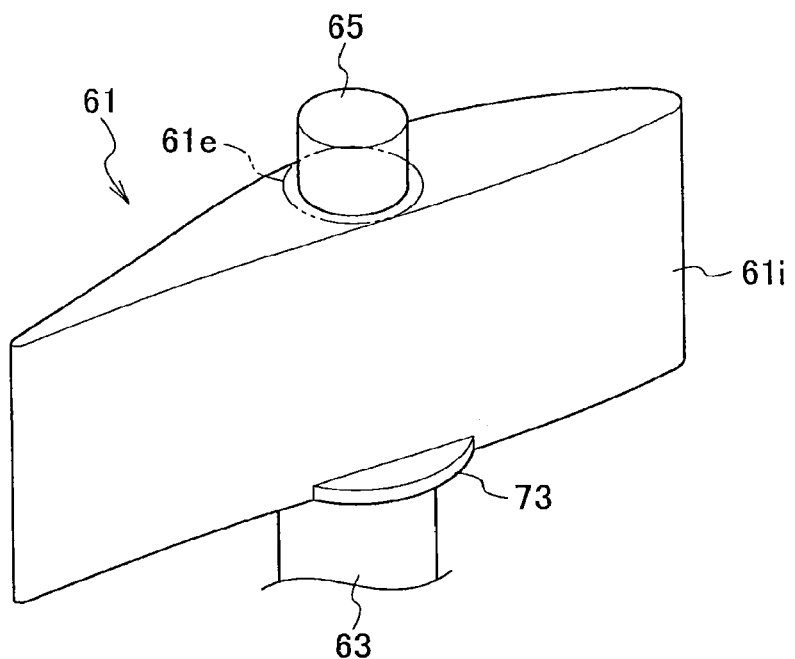
FIGS. 6A and 6B are perspective views each illustrating a variable nozzle in a variable nozzle unit according to an embodiment of the present disclosure.
Figure 6B:
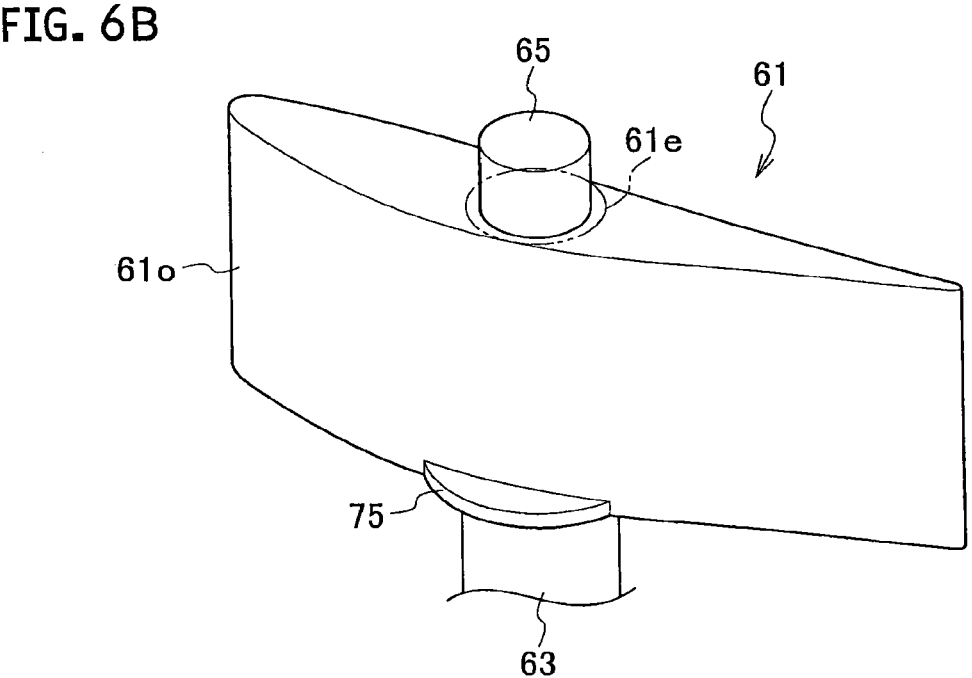

As illustrated in FIGS. 2 and 7, a turbine housing 27 is provided at the left side of the bearing housing 3. The turbine housing 27 has a shroud 27s provided therein. The turbine housing 27 has a turbine wheel 29 provided therein. The turbine wheel 29 is rotatably provided around its shaft center C (the shaft center of the turbine wheel 29, in other words, the shaft center of the rotor shaft 9), and generates rotational force (rotational torque) using pressure energy of an exhaust gas. The turbine wheel 29 includes a turbine disk 31 provided integrally on the left end portion of the rotor shaft 9. The turbine disk 31 has a hub surface 31h extending toward the right side (one side of the turbine wheel 29 in the axial direction) outward in the radial direction (outward in the radial direction of the turbine wheel 29). The hub surface 31h of the turbine disk 31 has plural turbine blades 33 provided integrally thereon and arranged at intervals in the circumferential direction. The turbine blades 33 each have a distal end edge (outer edge) 33t extending along the shroud 27s of the turbine housing 27.

A gas inlet 35 for taking exhaust gas is formed at an appropriate location in the turbine housing 27. The gas inlet 35 is connected to an exhaust manifold (not illustrated) of the engine. A turbine scroll passage 37 having a spiral shape is formed on the inlet side (upstream side in terms of the direction of flow of the main stream of the exhaust gas) of the turbine wheel 29 in the turbine housing 27. The turbine scroll passage 37 communicates with the gas inlet 35. A gas discharging port 39 for discharging the exhaust gas is formed on the outlet side (downstream side in terms of the direction of flow of the main stream of the exhaust gas) of the turbine wheel 29 in the turbine housing 27. The gas discharging port 39 is connected to an exhaust-gas cleaning unit (not illustrated) for cleaning the exhaust gas.

The variable geometry system turbocharger 1 is equipped with a variable nozzle unit 41 that varies the passage area (throat area) of the exhaust gas supplied to the turbine wheel 29 side. The variable nozzle unit 41 is disposed between the turbine scroll passage 37 and the turbine wheel 29 in the turbine housing 27.

Subsequently, the specific configuration of the variable nozzle unit 41 will be described.

As illustrated in FIGS. 1 and 2, a first nozzle ring 43 is disposed between the turbine scroll passage 37 and the turbine wheel 29 in the turbine housing 27. The first nozzle ring 43 is disposed concentrically with the turbine wheel 29 through a cup-like support ring 45. The first nozzle ring 43 has plural first supporting holes 47 formed at regular intervals in the circumferential direction (in a predetermined circumferential direction). Each of the first supporting holes 47 is a bottomless hole, that is a through-hole. The first nozzle ring 43 has an inner peripheral surface having a first stepped portion 49 formed thereon.

The first stepped portion 49 is formed into a ring shape, and recessed outward in the radial direction. Note that the outer-peripheral edge portion of the supporting ring 45 is held between the left side portion of the bearing housing 3 and the right side portion of the turbine housing 27. The plural first supporting holes 47 may be arranged in the circumferential direction at regular intervals, or at irregular intervals in accordance with specifications (performance) of a turbocharger.

A second nozzle ring 51 is provided at a location axially (in the axial direction of the turbine wheel 29, in other words, in the left and right direction) spaced apart from and opposite to the first nozzle ring 43. The second nozzle ring 51 is provided concentrically and integrally with the first nozzle ring 43 through plural coupling pins 53. The second nozzle ring 51 surrounds a ring-shaped projection 55 formed between the turbine scroll passage 37 and the turbine wheel 29 in the turbine housing 27 so as to protrude in the right direction (one side in the axial direction). In other words, the second nozzle ring 51 is located outward in the radial direction of the ring-shaped projection 55 of the turbine housing 27. Furthermore, the second nozzle ring 51 is located on a side (left side) further away from the bearing housing 3 than the first nozzle ring 43. The second nozzle ring 51 partially surrounds a distal end edge 33t of each of the plural turbine blades 33 with the ring-shaped projection 55 being placed between the second nozzle ring 51 and the distal end edge 33t. The second nozzle ring 51 has plural (only one is illustrated) bottomed second supporting holes 57 formed so as to match the plural first supporting holes 47 of the first nozzle ring 43. The second nozzle ring 51 has an inner peripheral surface having a second stepped portion 59 formed thereon. The second stepped portion 59 is formed into a ring shape, and is recessed outward in the radial direction. Here, the plural coupling pins 53 each have a function of configuring a space between the facing surface of the first nozzle ring 43 and the facing surface of the second nozzle ring 51. Note that the second nozzle ring 51 may be formed so as to have a cylindrical portion that surrounds the entire distal end edge 33t of each of the turbine blades 33 as described in Japanese Patent Application Laid-Open Publication Nos. 2013-2293 and 2011-247189.

As illustrated in FIGS. 1 to 5B, plural variable nozzles 61 are disposed between the facing surface (left side surface) of the first nozzle ring 43 and the facing surface (right side surface) of the second nozzle ring 51. The plural variable nozzles 61 are disposed at regular intervals in the circumferential direction (in a predetermined circumferential direction). The variable nozzles 61 are each rotatable around its shaft center, which is parallel to the shaft center C of the turbine wheel 29, in an opening or closing direction (forward or reverse direction). Each of the variable nozzles 61 has one side surface (right side surface, first side surface) formed integrally with a first nozzle shaft 63. Each first nozzle shaft 63 is rotatably supported with a corresponding first supporting hole 47 of the first nozzle ring 43. Each of the variable nozzles 61 has the other side surface (left side surface, second side surface) having a second nozzle shaft 65 formed integrally with the first nozzle shaft 63 in a concentric manner. Each second nozzle shaft 65 is rotatably supported with a corresponding second supporting hole 57 of the second nozzle ring 51. Note that the plural variable nozzles 61 may be arranged in the circumferential direction at regular intervals or at irregular intervals. The shaft center of each of the first nozzle shafts 63 and the shaft center of each of the second nozzle shafts 65 may be positioned closer to either a blade surface 61i (inside blade surface) located inward in the radial direction or a blade surface 61o (outside blade surface) located outward in the radial direction of each of the variable nozzles 61.

As illustrated in FIGS. 1 and 2, a ring-shaped link chamber 67 is formed on a surface side opposite to the facing surface of the first nozzle ring 43. A link mechanism 69 for synchronously rotating the plural variable nozzles 61 in the opening or closing direction is disposed in the link chamber 67. The link mechanism 69 is connected with each of the first nozzle shafts 63 so that the first nozzle shaft 63 of each of the variable nozzles 61 moves in a linked manner. The link mechanism 69 has a known configuration described, for example, in Japanese Patent Application Laid-Open Publication Nos. 2009-243300 and 2009-243431, and is connected through a power transmission mechanism 71 with a rotating actuator (not illustrated) such as a rotating motor or a rotating cylinder, which rotates the plural variable nozzles 61 in the opening or closing direction. Note that the link mechanism 69 may be disposed on an opposite surface side of the facing surface of the second nozzle ring 51, in place of being disposed on an opposite surface side of the facing surface of the first nozzle ring 43 (in the link chamber 67).

Subsequently, features of the variable nozzle unit 41 will be described.

As illustrated in FIGS. 1, 5A, 5B, 6A, and 6B, the opposite surface (right side surface) side of the facing surface of the first nozzle ring 43 communicates with the turbine scroll passage 37 through a communication hole (not illustrated) formed on the supporting ring 45. The second nozzle shaft 65 of each of the variable nozzles 61 has an outer diameter set so as to be smaller than that of the first nozzle shaft 63. A portion 61e enclosing the second nozzle shaft 65 on the other side surface (left side surface) of each of the variable nozzles 61 can contact with the facing surface of the second nozzle ring 51. Further, an inner nozzle flange (one of nozzle flanges) 73 that can contact with the facing surface of the first nozzle ring 43 is integrally formed with the base side of the first nozzle shaft 63 on a blade surface 61i (one blade surface) located inward in the radial direction of each of the variable nozzles 61. Furthermore, an outer nozzle flange (one of nozzle flanges) 75 that can contact with the facing surface of the first nozzle ring 43 is integrally formed with the base side of the first nozzle shaft 63 on a blade surface 61o (the other blade surface) located outward in the radial direction of each of the variable nozzles 61. Note that the portion 61e according to this embodiment encloses the entire circumference of the second nozzle shaft 65. However, for example, in the case where the second nozzle shaft 65 has an outer diameter larger than the thickness (blade thickness) of the variable nozzle 61, part of the second nozzle shaft 65 in the circumference direction may not be enclosed by the portion 61e.

Subsequently, the configuration of the periphery of the variable nozzle unit 41 will be described.

As illustrated in FIG. 1, a heat shield plate 77 is provided at the central portion of a side surface facing a back surface 31b of the turbine disk 31 in the bearing housing 3. The heat shield plate 77 is formed into a ring shape, and shields heat coming from the turbine wheel 29 side. The heat shield plate 77 is fixed to the bearing housing 3 with plural flush bolts 79 serving as an attachment member. The heat shield plate 77 is arranged concentrically with the turbine wheel 29. The heat shield plate 77 has an outer peripheral surface fitted into an inner peripheral surface of the first nozzle ring 43. The heat shield plate 77 has the inner peripheral edge portion having a ring-shaped fitting flange 81 formed thereon so as to protrude in the right direction. A fitting circumferential groove 83 is formed at the central portion of a side surface facing the back surface 31b of the turbine disk 31 in the bearing housing 3. The fitting circumferential groove 83 is formed concentrically with the turbine wheel 29. The fitting flange 81 of the heat shield plate 77 is fitted into this fitting circumferential groove 83. Furthermore, the heat shield plate 77 has the outer peripheral surface having an insert circumferential groove 85 formed thereon.

The first stepped portion 49 of the first nozzle ring 43 has a bottom surface 49u having plural first seal rings 87 provided in a pressure-contacted manner with their own elastic force (elastic force of each of the first seal rings 87). Each of the first seal rings 87 suppresses leakage of exhaust gas from the opposite surface side of the facing surface of the first nozzle ring 43, to the inlet side of the turbine wheel 29. The inner peripheral edge portion of each of the first seal rings 87 is fitted into the insert circumferential groove 85 of the heat shield plate 77.

It should be noted that the heat shield plate 77 may be provided so as to be fitted into the outer peripheral surface of a projection (not illustrated) of the bearing housing 3 as described, for example, in Japanese Patent Application Laid-Open Publication No. 2013-194546. In such a case, the plural first seal rings 87 are removed, and an energizing member (not illustrated) such as a wave washer that energizes the heat shield plate 77 to the direction to be pressure-contacted with the inner peripheral edge portion of the first nozzle ring 43 is provided at an appropriate position on the projection of the bearing housing 3.

The projection 55 of the turbine housing 27 has an outer peripheral surface having an insert circumferential groove 89 formed thereon. The second stepped portion 59 of the second nozzle ring 51 has a bottom surface 59u having plural second seal rings 91 provided in a pressure-contacted manner with their own elastic force (elastic force of each of the second seal rings 91). Each of the second seal rings 91 suppresses leakage of exhaust gas from the opposite surface side of the facing surface of the second nozzle ring 51 to the inlet side of the turbine wheel 29. The inner peripheral edge portion of each of the second seal rings 91 is fitted into the insert circumferential groove 89 of the projection 55 of the turbine housing 27.

Subsequently, operation and effect of the embodiment according to the present disclosure will be described.

Exhaust gas, which is taken in from the gas inlet 35, is caused to flow from the inlet side of the turbine wheel 29 to the outlet side through the turbine scroll passage 37, thereby rotational force (rotational torque) is generated by using pressure energy of the exhaust gas, and thus it is possible to integrally rotate the rotor shaft 9 and the compressor wheel 13 with the turbine wheel 29. This makes it possible to compress air taken in from the air inlet 19, to discharge the compressed air from the air discharging port 25 through the diffuser passage 21 and the compressor scroll passage 23, and to supercharge (compress) air supplied to the engine.

In the case where the engine operates in a high revolution range and the flow volume of the exhaust gas is large during operations of the variable geometry system turbocharger 1, the rotating actuator is driven to operate the link mechanism 69, and at the same time, the plural variable nozzles 61 are caused to synchronously rotate in the forward direction (opening direction). This makes it possible to increase the passage area (throat area) of the exhaust gas to be supplied to the turbine wheel 29 side, and to supply the large volume of exhaust gas to the turbine wheel 29 side.

In the case where the engine operates in a low revolution range and the flow volume of the exhaust gas is small, the rotating actuator is driven to operate the link mechanism 69, and at the same time, the plural variable nozzles 61 are caused to synchronously rotate in the reverse direction (closing direction). This makes it possible to reduce the passage area of the exhaust gas to be supplied to the turbine wheel 29 side to increase the fluid velocity of the exhaust gas, and to sufficiently secure the work volume of the turbine wheel 29.

The enclosing portion 61e on the other side surface of each of the variable nozzles 61 can contact with the facing surface of the second nozzle ring 51, and therefore it is possible to suppress entry of soot or other foreign substances into the second supporting hole 57 of the second nozzle ring 51 by closing the gap between the inner peripheral surface of the second supporting hole 57 of the second nozzle ring 51 and the outer peripheral surface of the second nozzle shaft 65 of the variable nozzle 61. The inner nozzle flange 73 and the outer nozzle flange 75 of each of the variable nozzles 61 can contact with the facing surface of the first nozzle ring 43, and therefore it is possible to suppress the entry of foreign substances into the first supporting hole 47 of the first nozzle ring 43 by closing the gap between the inner peripheral surface of the first supporting hole 47 of the first nozzle ring 43 and the outer peripheral surface of the first nozzle shaft 63 of the variable nozzle 61. Furthermore, the enclosing portion 61e on the other side surface of each of the variable nozzles 61 can contact with the facing surface of the second nozzle ring 51, and the inner nozzle flange 73 and the outer nozzle flange 75 of each of the variable nozzles 61 can contact with the facing surface of the first nozzle ring 43, and therefore it is possible to suppress tilting of the variable nozzle 61 (shaft center of the variable nozzle 61) by stabilizing the supporting state of the variable nozzle 61 with the facing surface of the first nozzle ring 43 and the facing surface of the second nozzle ring 51. In other words, it is possible to suppress the entry of foreign substances into, for example, the first supporting hole 47 of the first nozzle ring 43, and also suppress tilting of the variable nozzle 61, even if nozzle flanges (inner nozzle flange and outer nozzle flange), which impede the flow of main stream of the exhaust gas, are removed from the base end side of the second nozzle shaft 65 of each of the variable nozzles 61.

Since each of the first supporting holes 47 of the first nozzle ring 43 is a bottomless hole (through-hole), the opposite surface side of the facing surface of the first nozzle ring 43 communicates with the turbine scroll passage 37, and each of the second supporting holes 57 of the second nozzle ring 51 is bottomed, it is possible to sufficiently increase the pressure acting on the end surface of the first nozzle shaft 63 of each of the variable nozzles 61 more than the pressure acting on the end surface of the second nozzle shaft 65 during operation of the variable geometry system turbocharger 1. This makes it possible to reduce the flow of leakage from the gap between the left side surface of each of the variable nozzles 61 and the facing surface of the second nozzle ring 51 by shifting each of the variable nozzles 61 closer to the facing surface side of the second nozzle ring 51 due to the pressure difference during operation of the variable geometry system turbocharger 1.

As described above, the embodiment according to the present disclosure can suppress entry of foreign substances into, for example, the first supporting hole 47 of the first nozzle ring 43, and also suppress tilting of each of the variable nozzles 61 even if nozzle flanges, which impede the flow of main stream of the exhaust gas, are removed from the base end side of the second nozzle shaft 65 of each of the variable nozzles 61. Thus, it is possible to achieve further improvement in turbine efficiency of the Variable Geometry System turbocharger 1 by reducing the pressure loss between variable nozzles 61 during operation of the Variable Geometry System turbocharger 1, while stabilizing the flow of the exhaust gas on the facing surface side of the second nozzle ring 51.

In particular, since the flow of leakage from the gap between the left side surface of each of the variable nozzles 61 and the facing surface of the second nozzle ring 51 can be reduced during operation of the variable geometry system turbocharger 1, it is possible to achieve further improvement in turbine efficiency of the Variable Geometry System turbocharger 1 by stabilizing the flow of the exhaust gas on the shroud 27s side of the turbine housing 27 in the turbine wheel 29.

It should be noted that the present disclosure is not limited to the embodiment described above, and can be variously carried out, for example, in the following manner.

More specifically, it may be possible to set the outer diameter of the first nozzle shaft 63 of each of the variable nozzles 61 to be smaller than the outer diameter of the second nozzle shaft 65, instead of setting the outer diameter of the second nozzle shaft 65 of each of the variable nozzles 61 to be smaller than the outer diameter of the first nozzle shaft 63. In such a case, a portion enclosing the first nozzle shaft 63 on one side surface (right side surface) of each of the variable nozzles 61 can contact with the facing surface of the first nozzle ring 43. Furthermore, another nozzle flange (not illustrated) that can contact with the facing surface of the second nozzle ring 51 will be formed on the base side of the second nozzle shaft 65 on each of the blade surface 61i located inward in the radial direction and the blade surface 61o located outward in the radial direction of each of the variable nozzles 61. In addition, the variable nozzle 61 has a nozzle shape (blade shape) constant along the axial direction, in other words, is a so-called two-dimensional nozzle. However, in stead of using the variable nozzle 61, it may be possible to use, for example, a so-called three-dimensional nozzle having a nozzle shape that is not constant along the axial direction (see, for example, Japanese Patent Application Laid-Open Publication No. 2012-246807).

The scope of right included in the present disclosure is not limited to the embodiment described above. Various types of variable geometry system turbochargers including a two-dimensional nozzle such as the variable nozzle 61, a three-dimensional nozzle, or other nozzles should also be included.

What is claimed is:

1. A variable nozzle unit disposed between a turbine scroll passage and a turbine wheel in a turbine housing of a variable geometry system turbocharger, comprising:

a first nozzle ring disposed in the turbine housing and having a plurality of first supporting holes formed at intervals in a circumferential direction;

a second nozzle ring provided integrally with the first nozzle ring at a location axially spaced apart from and opposite to the first nozzle ring, and having a plurality of second supporting holes formed so as to match the plurality of first supporting holes of the first nozzle ring;

a plurality of variable nozzles disposed at intervals in the circumferential direction and between the first nozzle ring and the second nozzle ring, the plurality of variable nozzles being capable of rotating in a forward or reverse direction about a shaft center parallel to a shaft center of the turbine wheel, and each variable nozzle having a first nozzle shaft and a second nozzle shaft, the first nozzle shaft being integrally formed on a first side surface of each of the plurality of variable nozzles and rotatably supported with the corresponding first supporting hole of the first nozzle ring, and the second nozzle shaft being integrally formed on a second side surface of each of the plurality of variable nozzles and rotatably supported with the corresponding second supporting hole of the second nozzle ring; and a link configured to synchronously rotate the plurality of variable nozzles in the forward or reverse direction, wherein an outer diameter of one nozzle shaft of the first nozzle shaft and the second nozzle shaft of each variable nozzle is smaller than an outer diameter of the other nozzle shaft of the first nozzle shaft and the second nozzle shaft, wherein a portion enclosing the one nozzle shaft on one of the first side surface and the second side surface of each of the variable nozzles is configured to be capable of contacting with one nozzle ring of the first nozzle ring and the second nozzle ring, wherein a nozzle flange is integrally formed on a base side of the other nozzle shaft on a blade surface of each of the plurality of variable nozzles so that the nozzle flange can contact the other nozzle ring of the first nozzle ring and the second nozzle ring, and wherein the one nozzle shaft and the other nozzle shaft of the first nozzle shaft and the second nozzle shaft each consist of only one outer diameter housed within the first nozzle ring and the second nozzle ring.

2. The variable nozzle unit according to claim 1, wherein the second nozzle ring is located on a side further away from a bearing housing of the variable geometry system turbocharger than the first nozzle ring, the one nozzle shaft is the second nozzle shaft, the other nozzle shaft is the first nozzle shaft, the one nozzle ring is the second nozzle ring, and the other nozzle ring is the first nozzle ring.

3. The variable nozzle unit according to claim 1, wherein the first nozzle ring includes a facing surface to the second nozzle ring, an opposite surface side of the facing surface of the first nozzle ring communicates with the turbine scroll passage, each of the first supporting holes of the first nozzle ring is bottomless, and each of the second supporting holes of the second nozzle ring is bottomed.

4. The variable nozzle unit according to claim 2, wherein the first nozzle ring includes a facing surface to the second nozzle ring, an opposite surface side of the facing surface of the first nozzle ring communicates with the turbine scroll passage, each of the first supporting holes of the first nozzle ring is bottomless, and each of the second supporting holes of the second nozzle ring is bottomed.

5. A variable geometry system turbocharger comprising a variable nozzle unit according to claim 1.

\* \* \* \* \*